(12) United States Patent
Schroeder et al.

(10) Patent No.: US 9,920,865 B2
(45) Date of Patent: Mar. 20, 2018

(54) CLAMPING RING, SLIDING SLEEVE, ARRANGEMENT, AND METHOD FOR PRODUCING A NON-RELEASABLE CONNECTION

(71) Applicant: Viega Technology GmbH & Co. KG, Attendorn (DE)

(72) Inventors: Klaus Schroeder, Attendorn (DE); Matthias Stahlschmidt, Plettenberg (DE); Karsten Bohr, Attendorn (DE); Sudi Sinoplu, Attendorn (DE); Detlev Schmitt, Drolshagen (DE)

(73) Assignee: Viega Technology GmbH & Co. KG, Attendorn (DE)

( * ) Notice: Subject to any disclaimer, the term of this patent is extended or adjusted under 35 U.S.C. 154(b) by 0 days.

(21) Appl. No.: 15/109,701

(22) PCT Filed: Dec. 17, 2014

(86) PCT No.: PCT/EP2014/078132
§ 371 (c)(1),
(2) Date: Jul. 5, 2016

(87) PCT Pub. No.: WO2015/101495
PCT Pub. Date: Jul. 9, 2015

(65) Prior Publication Data
US 2016/0327189 A1   Nov. 10, 2016

(30) Foreign Application Priority Data
Jan. 3, 2014  (DE) .......... 10 2014 100 028

(51) Int. Cl.
F16L 25/00 (2006.01)
F16L 13/14 (2006.01)
F16L 33/22 (2006.01)

(52) U.S. Cl.
CPC .......... F16L 13/146 (2013.01); F16L 33/225 (2013.01)

(58) Field of Classification Search
CPC .............................. F16L 13/146; F16L 33/225
(Continued)

(56) References Cited

U.S. PATENT DOCUMENTS 4,061,367 A     12/1977  Moebius
4,614,372 A  *   9/1986  Gschwind ............... F16L 47/04
                                                          285/250
(Continued)

FOREIGN PATENT DOCUMENTS

CH          663653 A5    12/1987
DE        19856523 C1     3/2000
(Continued)

Primary Examiner — Aaron M Dunwoody
Assistant Examiner — Fannie C Kee
(74) Attorney, Agent, or Firm — The Webb Law Firm (57) ABSTRACT

A clamping ring for a non-releasable workpiece connection includes an inner circumferential surface, an outer circumferential surface, a proximal end, and a distal end, said inner circumferential surface having a cylindrical design in at least some sections. A sliding sleeve for a non-releasable workpiece connection includes an inner circumferential surface, an outer circumferential surface, a proximal end, and a distal end. An arrangement for producing a non-releasable workpiece connection and a method for producing a non-releasable workpiece connection are provided.

18 Claims, 10 Drawing Sheets

(58) Field of Classification Search
USPC .............. 285/382, 382.7, 81, 86, 242, 256
See application file for complete search history.

(56) References Cited

U.S. PATENT DOCUMENTS

| | | | |
|---|---|---|---|
| 7,270,349 B2 * | 9/2007 | Bamberger | ........... F16L 37/091 285/249 |
| 7,644,958 B2 * | 1/2010 | Postler | .................. F16L 33/224 285/23 |
| 2002/0000721 A1 | 1/2002 | Ohya | |

FOREIGN PATENT DOCUMENTS

| | | |
|---|---|---|
| DE | 10021306 A1 | 11/2001 |
| DE | 102004026136 A1 | 12/2005 |
| DE | 102008024360 A1 | 12/2009 |
| EP | 1288554 A1 | 3/2003 |
| EP | 1717503 A2 | 11/2006 |

* cited by examiner

CLAMPING RING, SLIDING SLEEVE, ARRANGEMENT, AND METHOD FOR PRODUCING A NON-RELEASABLE CONNECTION

CROSS-REFERENCE TO RELATED APPLICATIONS

This application is the United States national phase of International Application No. PCT/EP2014/078132 filed Dec. 17, 2014, and claims priority to German Patent Application No. 10 2014 100 028.5 filed Jan. 3, 2014, the disclosures of which are hereby incorporated in their entirety by reference.

BACKGROUND OF THE INVENTION

Field of the Invention

The invention relates to a clamping ring for a non-releasable workpiece connection, having an inner circumferential surface and an outer circumferential surface, and having a proximal end and a distal end, wherein the inner circumferential surface is formed cylindrical at least in sections. The invention furthermore relates to a sliding sleeve for a non-releasable workpiece connection, having an inner circumferential surface and an outer circumferential surface, and having a proximal end and a distal end. The invention additionally relates to an arrangement for producing a non-releasable workpiece connection and a method for producing a non-releasable workpiece connection.

The generic arrangement additionally has a fitting, a clamping ring and a sliding sleeve, wherein the fitting has a profiled support body, wherein the clamping ring has an inner circumferential surface and an outer circumferential surface as well as a proximal end and a distal end, wherein the inner circumferential surface of the clamping ring is formed cylindrical at least in sections and wherein the sliding sleeve has an inner circumferential surface and an outer circumferential surface as well as a proximal end and a distal end.

Description of Related Art

Clamping rings, sliding sleeves, arrangements, and methods of the type referred to at the beginning for non-releasable pipe connections are already known from prior art, for example from the field of gas lines or drinking water. With a non-releasable pipe connection it is here in particular understood that the connection is designed not to be released and re-connected, therefore cannot be released again or can only be released again with difficulty, in particular only by destroying the individual workpieces of the pipe connection. Here, the pipe connection is to be produced as simply and securely as possible and is to ensure a high leak tightness for as long a time as possible.

For producing a non-releasable connection, firstly a pipe is arranged between a clamping ring and a support body of a fitting. The non-releasable connection is then produced by sliding the sliding sleeve onto the clamping ring, in particular by means of compression by a pressing tool. The pipe, the sliding sleeve, the clamping ring and the fitting here preferably have a mutual axis. During an axial sliding of the sliding sleeve onto the clamping ring, the contact surfaces of the sliding sleeve and the clamping ring are designed to be inclined relative to the axis in order to convert the axial movement of the sliding sleeve at least partially into a pressing force acting radially inwards on the clamping ring. This radial pressing force acts on the pipe due to the tapering of the clamping ring and thus enables a forming of the pipe onto the support body of the fitting.

Here, in particular, the pressing force must act evenly on the length of the support body in order to form the pipe evenly onto the fitting and to enable a sufficient leak tightness of the connection, which is why the angled contact surfaces extend approximately over the entire length of the support body. However, the friction between the sliding sleeve and the clamping ring during the sliding is thereby increased.

A technical problem of the present invention is therefore to specify a clamping ring, a sliding sleeve, an arrangement, and a method for non-releasable connection of workpieces in which lower axial pressing forces are converted into high radial pressing forces, small axial movements are sufficient for compression and a high durability of the non-releasable connection is ensured.

SUMMARY OF THE INVENTION

According to a first teaching of the present invention, this technical problem is solved with a generic clamping ring in that at least two transmission regions which are spaced apart from each other in an axial direction are arranged on the outer circumferential surface, that the transmission regions have cone segment-shaped portions, and that the transmission regions have cylindrical portions.

According to a second teaching of the present invention, this technical problem is solved with a generic sliding sleeve in that at least two transmission regions which are spaced apart from each other in an axial direction are arranged on the inner circumferential surface of the sliding sleeve, that the transmission regions have cone segment-shaped portions, and that the transmission regions have cylindrical portions.

According to a further teaching of the present invention, this technical problem is solved with a generic arrangement in that each transmission region of the clamping ring is allocated to a transmission region of the sliding sleeve.

Due to the arrangement of at least two transmission regions which are spaced apart from each other in an axial direction on the outer circumferential surface of the clamping ring and on the inner circumferential surface of the sliding sleeve, a division of the radial pressing force onto several transmission regions is enabled. During sliding of the sliding sleeve from the outside onto the clamping ring, the transmission regions form the contact surfaces between the clamping ring and the sliding sleeve and serve for the conversion of an axial movement into a radial pressing force. Since only the transmission regions and not the entire length of the clamping ring are used for the conversion, the friction during sliding of the sliding sleeve onto the clamping ring is reduced. Additionally, the radial pressing force exerted by the transmission regions can be varied via the configuration of the transmission regions.

According to the invention, the transmission portions have cone segment-shaped portions, whereby the axial movement during sliding can be converted efficiently into a radial pressing force. The conical segment-shaped portions represent contact surfaces inclined towards the axis for between clamping ring and sliding sleeve. Due to the cone opening angle and the axial length of the cone segment-shaped portions, the radial displacement of the clamping ring resulting due to a sliding of the sliding sleeve can here be adjusted. In particular, due to a high cone opening angle with short axial lengths of the cone segment-shaped portion, a high pressing force can be caused with only low axial pressing paths. The cone opening angle here preferably amounts to 10° to 35°, preferably 15° to 30°, in particular 22°. Due to the selection of such a cone opening angle, sufficient radial pressing force for a non-releasable connection can be built up with a short axial pressing path.

Due to the lower axial pressing forces, more cost-effective and production-friendly materials, for example plastic materials, can be used for producing the clamping ring, the sliding sleeve and the fitting. Plastic materials are additionally often resistant to corrosion, whereby in particular an application of the workpiece connection in the ground is possible. Preferably glass fibre-reinforced polyamide is used for producing the clamping ring, the sliding sleeve and the fitting, but all other plastic materials permissible for applications with drinking water or gas, or combinations thereof, are also possible. Here, at least parts of the clamping ring, the sliding sleeve and/or the fitting can be produced from metal, for example in order to enable a sufficient stiffness of the support body during compression. Here, preferably metals permissible for applications with drinking water are used, such as, for example, red brass, brass, or even stainless steels.

It has turned out that no further sealants, for example in the form of O-rings or layers of elastomers, are required for the leak tightness of the workpiece connection. Therefore, additional production expenditure during the production of the arrangement is prevented and the durability of the workpiece connection is increased.

The cone segment-shaped portions can, in particular, be formed as sliding surfaces. For this, the surfaces of the cone segment-shaped portions can be designed to be particularly smooth or even consist of a material which is incorporated into the clamping ring and the sliding sleeve and enables or facilitates sliding. Additionally, slide-promoting means can be applied to the surface of the cone segment-shaped portions.

In a preferred embodiment of the present invention, the cone segment-shaped portions are designed in such a way that several cone segment-shaped portions have the same cone opening angle and the same axial length, whereby the same radial displacement is achieved on several transmission regions after a compression. In particular, all cone segment-shaped portions can have the same cone opening angle and the same axial length. In a particularly preferred embodiment of the invention, the transmission regions of the clamping ring are additionally distributed evenly over the axial length of the clamping ring, whereby despite the axial spacing between the transmission regions, an approximately even pressing force results over the axial length of the clamping ring.

The radial displacement of the clamping ring resulting during the sliding of the sliding sleeve can, however, also be selected to be different on the individual transmission regions. The resulting pressing force can, in particular, be adapted to the properties of a pipe to be compressed. For example, the radial displacement can be designed to be greater on a transmission region located at the distal end of the clamping ring in order to cause a higher leak tightness of the connection there, or in order to meet a greater stiffness of a workpiece at the distal end.

Furthermore, according to the invention, the transmission regions have cylindrical portions. The cylindrical portions here represent contact surfaces between the clamping ring and the sliding sleeve which maintain the radial pressing force in the completed connection after a sliding and cause the non-releasability and leak tightness. Here, the pressing force of the individual transmission regions can be adjusted to be different or at least partially the same via the axial length of the cylindrical portions and the diameter thereof, depending on the purpose, as described above.

In a preferred embodiment of the present invention, the respective diameter of the individual cylindrical portions increases from the distal to the proximal end. In this way, the geometry of the clamping ring allows a simple arrangement of the sliding sleeve on the outside on the clamping ring, in that the sliding sleeve is brought onto the clamping ring for compression before the actual sliding from the distal end in the direction of the proximal end. With the increase of the diameter of the individual cylindrical portions from the distal to the proximal end, the clamping ring, conversely, adopts a shape which tapers towards the distal end. This can be understood in that a conceived connection line of the diameter of the individual cylindrical portions tapers from the proximal end towards the distal end.

In an advantageous embodiment, the outer circumferential surface of the clamping ring has at least one holding recess to which a holding protrusion located on the inner circumferential surface of the sliding sleeve is allocated. After the arrangement of the sliding sleeve on the clamping ring, the holding protrusion engages radially inwards with the holding recess and fixes the sliding sleeve temporarily on the clamping ring.

According to a preferred embodiment of the invention, the cone segment-shaped portions are formed ring shaped in circumference. In this way, the pressing force exerted by the transmission portions during the sliding is distributed evenly along the circumference. Several cone segment-shaped portions can also be arranged on a trajectory which is ring shaped in circumference.

An arrangement of the cone segment-shaped portions at regular axial distances is preferred, whereby the pressing force is distributed approximately evenly along the axial length of the clamping ring.

In a further advantageous embodiment of the present invention, the clamping ring has a slot at least over a part of the length in the axial direction. This reduces the forces required for radial forming of the clamping ring. In particular in the case of materials which are difficult to form for the clamping ring, such as, for example, plastic materials, the slot enables a reliable non-releasable radial compression. However, the slot in the clamping ring is also advantageous for the compression for easily formable materials. A slot extending over the entire axial length is preferred in order to enable an approximately even compression over the length.

According to a further teaching of the present invention, the technical problem is also solved by a method for producing a non-releasable workpiece connection between a fitting, a pipe, a clamping ring and a sliding sleeve, wherein the fitting has a profiled support body, and wherein the clamping ring is arranged on the fitting, in which the pipe is introduced between the clamping ring and the support body of the fitting, in which at least two transmission regions which are allocated to each other and spaced apart from each other in an axial direction are brought into contact with cone segment-shaped portions on the outer circumferential surface of the clamping ring and on the inner circumferential surface of the sliding sleeve respectively, and in which a pressing force directed radially inwards is exerted on the pipe against the support body during an axial sliding of the sliding sleeve onto the clamping ring.

To cause the axial movement, the outer circumferential surface of the sliding sleeve can adopt different embodiments. For example, a flange can be arranged on one of the two ends of the sliding sleeve, said flange serving an axial pressing tool as a contact surface. Likewise, a surface inclined against the axis, for example a cone segment-shaped surface, can be formed as a contact surface and in particular sliding surface for a radial tool, whereby the conversion of a radially inwards movement into an axial movement is enabled. Further embodiments of the outer circumferential surface of the sliding sleeve are conceivable depending on the shape of the tools used.

According to the invention, the sliding sleeve is arranged on the clamping ring before the sliding. This can, for example, be caused by the combination of a holding recess with a holding protrusion, which fixes the sliding sleeve temporarily on the clamping ring. According to the invention, the clamping ring is thereby arranged on the fitting. In particular, the inner circumferential surface of the clamping ring has a latch protrusion reaching radially inwards, to which a latch recess on the base body of the fitting is allocated. Before the compression, the latch protrusion is already engaged with the latch recess and therefore fixes the clamping ring temporarily on the fitting. Additionally, the inner circumferential surface of the clamping ring can have a positioning aid which positions the clamping ring on the support body in a coaxial manner. In this way, the user of the method according to the invention can combine the fitting, the clamping ring and the sliding sleeve before the actual compression to form an arrangement and can concentrate on the connection between this arrangement and the pipe.

The pipe to be compressed is, according to the invention, introduced between the fitting and the clamping sleeve. After the introduction, the pipe lies between the profile of the support body and the inner circumferential surface of the clamping ring. In particular, here, a flange is provided on the support body of the fitting as a stop to contact with the pipe end. In particular, during introduction of the pipe, the positioning aid arranged on the clamping ring can touch the pipe end and the clamping ring can thereby be slid axially in the direction of the proximal end, whereby the clamping ring is brought into the position on the fitting which is optimal for compression.

According to the invention, the transmission regions of the sliding sleeve and the clamping ring are brought into contact with the cone segment-shaped portions. Here, it is possible that only individual or also several of the transmission regions come into contact at the same time. This can be caused by a corresponding selection of the spacing of the transmission regions on the clamping ring and on the sliding sleeve. For example, a radial compression only by transmission regions close to the distal end can be planned. However, a simultaneous contact of all transmission regions is preferred for the purpose of a simultaneous compression, which is caused by substantially equal spacing between the allocated transmission regions.

According to the invention, during the axial sliding of the sliding sleeve onto the clamping ring, a pressing force directed radially inwards is exerted on the pipe against the support body by the transmission regions. This is, in particular, caused via a sliding of the conical portions described above of the allocated transmission regions of the clamping ring and the sliding sleeve. Due to the distribution of the transmission regions over the axial length of the clamping ring, a pressing force is exerted on the pipe in sections. It has turned out that already few transmission portions are sufficient in order to nevertheless enable an even compression of the pipe and an even forming of the pipe on the profile of the support body, and therefore to produce a non-releasable and tight connection. In particular, three transmission portions are sufficient for many pipe types and pipe materials. The cone opening angle can, in the case of a small number of transmission portions, be selected to be correspondingly steep, whereby the axial pressing path is shortened.

In a preferred embodiment of the invention, the inner circumferential surface of the clamping ring has a latch protrusion reaching radially inwards which protrudes into a latch recess on the base body of the fitting for the temporary fixing of the clamping ring to the fitting. Due to the radial compression of the clamping ring, the latch protrusion is slid further radially into the latch recess. After successful compression, the combination of the latch protrusion and the latch recess furthermore secures the clamping ring against a release from the fitting.

In a further advantageous embodiment of the invention, a means for fixing is arranged on the proximal end of the sliding sleeve and on the base body of the fitting respectively. After a completed sliding of the sliding sleeve, the means for fixing are connected to each other and a release of the sliding sleeve from the fitting is prevented. The means for fixing can, for example be two hooks which reach and lock into each other. A bore and a thread for a screw connection or also further connections are possible.

BRIEF DESCRIPTION OF THE DRAWINGS

Below, the invention is explained in more detail by means of an exemplary embodiment depicted in drawings. In the drawings.

Not all features of the exemplary embodiment are formed to be continuously ring shaped in circumference. Therefore, several sectional views of the clamping ring, the sliding sleeve and the arrangement are shown in the figures for clarity.

DESCRIPTION OF THE INVENTION

Figure 1:
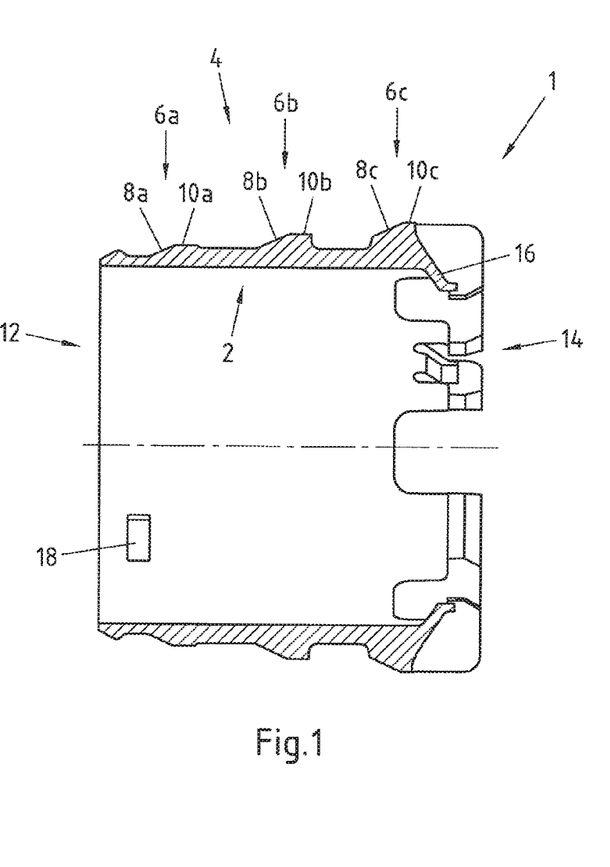
FIG. 1 shows an exemplary embodiment of a clamping ring in a side view in a first sectional view.

FIG. 1 shows an exemplary embodiment of a clamping ring 1 in a side view in a first sectional view. The inner circumferential surface 2 of the clamping ring 1 is substantially cylindrical. Three transmission regions 6a, 6b, 6c are arranged on the outer circumferential surface 4 of the clamping ring 1, which have cone segment-shaped portions 8a, 8b, 8c as well as cylindrical portions 10a, 10b, 10c. The cone segment-shaped portions 8a, 8b, 8c are here formed with approximately the same cone opening angles and approximately the same axial lengths. The respective diameter of the cylindrical portions 10a, 10b, 10c increases from the distal end 12 to the proximal end 14. A positioning aid 16 is arranged on the proximal end 14.

Figure 2:
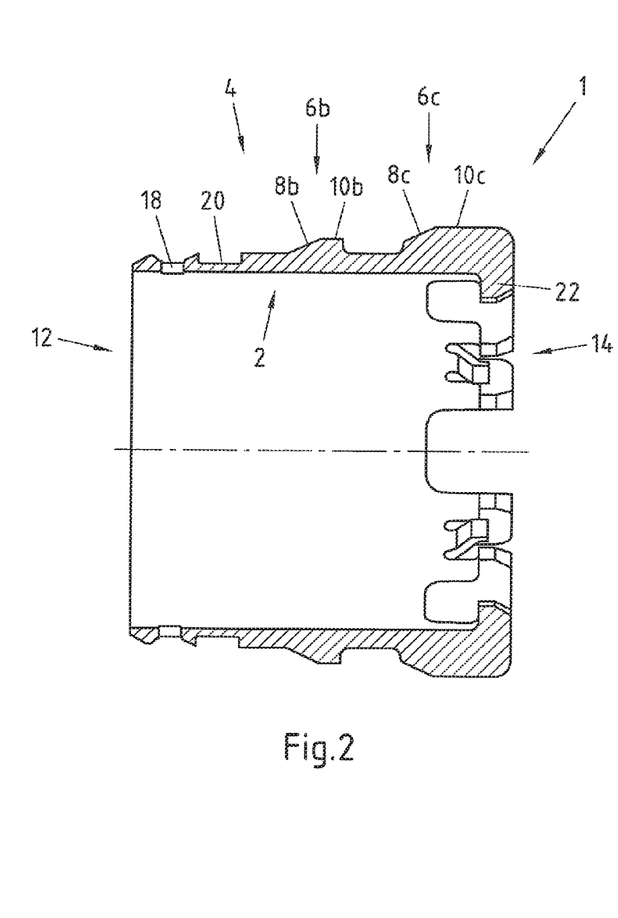
FIG. 2 shows the clamping ring from FIG. 1 in a second sectional view.

In FIG. 2, a second sectional view of the clamping ring 1 from FIG. 1 is shown. The holding recess 18 is arranged on the outer circumferential surface 4 close to the distal end 12. The holding recess 18 is formed as a recess which is continuous to the inner circumferential surface 2. A latch recess 20 is located next to the holding recess 18 in the direction of the proximal end 14. A latch protrusion 22 is arranged on the inner circumferential surface 2 on the proximal end 14.

Figure 3:
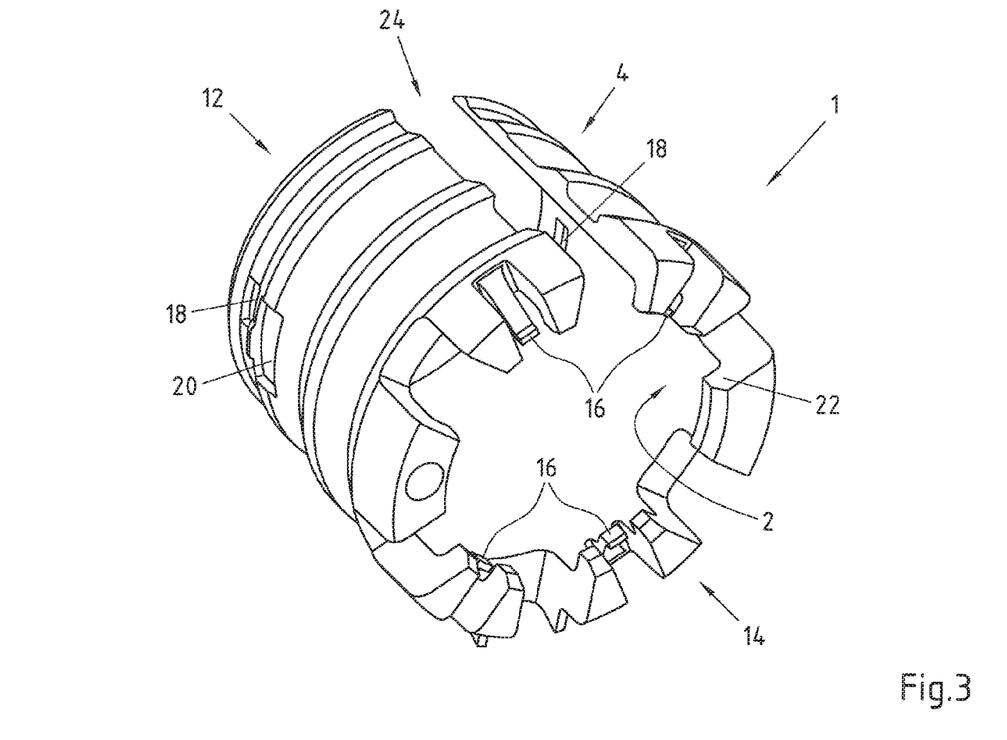
FIG. 3 shows the clamping ring from FIGS. 1 and 2 in a perspective view.

FIG. 3 shows the clamping ring 1 from FIGS. 1 and 2 in a perspective view. The clamping ring 1 has a slot 24 in the axial direction. The slot 24 extends over the full axial length of the clamping ring 1.

Figure 4:
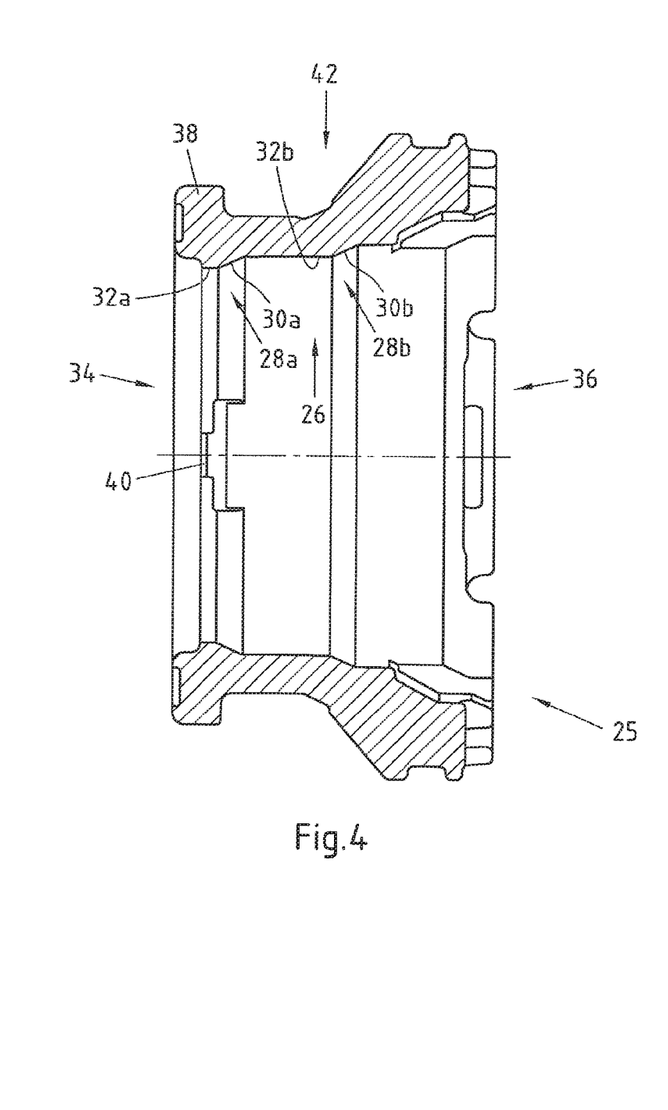
FIG. 4 shows an exemplary embodiment of a sliding sleeve in a side view in a first sectional view.

FIG. 4 shows an exemplary embodiment of a sliding sleeve 25 in a side view in a first sectional view. Three transmission regions 28a, 28b, 28c are arranged on the inner circumferential surface 26 of the sliding sleeve 25. The transmission regions 28a, 28b, 28c have cone segment-shaped portions 30a, 30b, 30c and cylindrical portions 32a, 32b, 32c. The cone segment-shaped portions 30a, 30b, 30c are here provided with approximately the same cone opening angles and approximately the same axial lengths. The respective diameter of the cylindrical portions 32a, 32b, 32c increases from the distal end 34 to the proximal end 36. A flange 38 is provided on the distal end 34 as a contact surface for an axial pressing tool which is not shown here.

Figure 5:
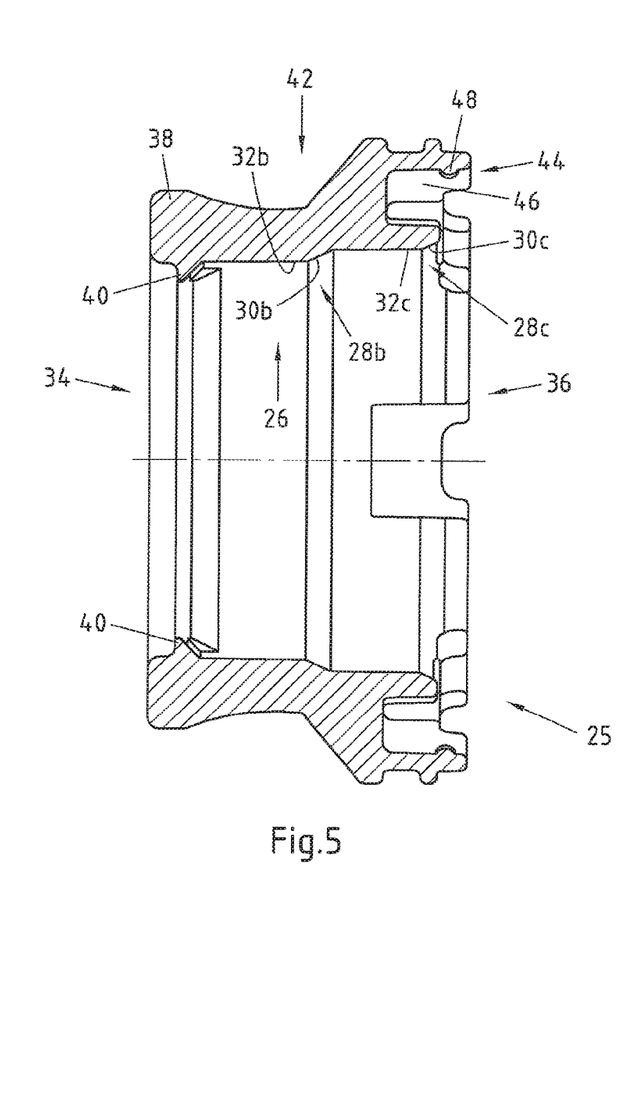
FIG. 5 shows the sliding sleeve from FIG. 4 in a second sectional view.

In FIG. 5, a second sectional view of the sliding sleeve 25 from FIG. 4 is shown. A holding protrusion 40 is arranged on the inner circumferential surface 26 in proximity to the distal end 34. A means for fixing 44 is provided on the proximal end 36 close to the outer circumferential surface 42. The means for fixing 44 comprises a recess 46 having a bulge 48 located on a surface.

Figure 6:
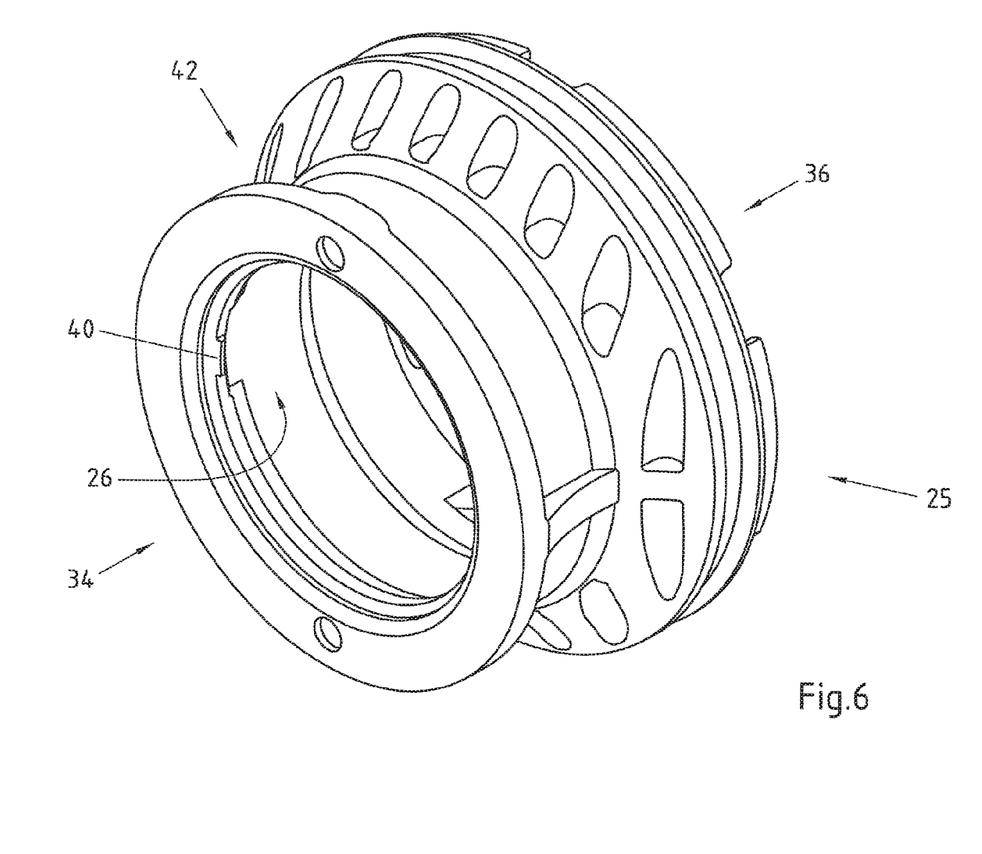
FIG. 6 shows the sliding sleeve from FIGS. 4 and 5 in a perspective view.

FIG. 6 shows the sliding sleeve 25 from FIGS. 4 and 5 in a perspective view.

Figure 7:
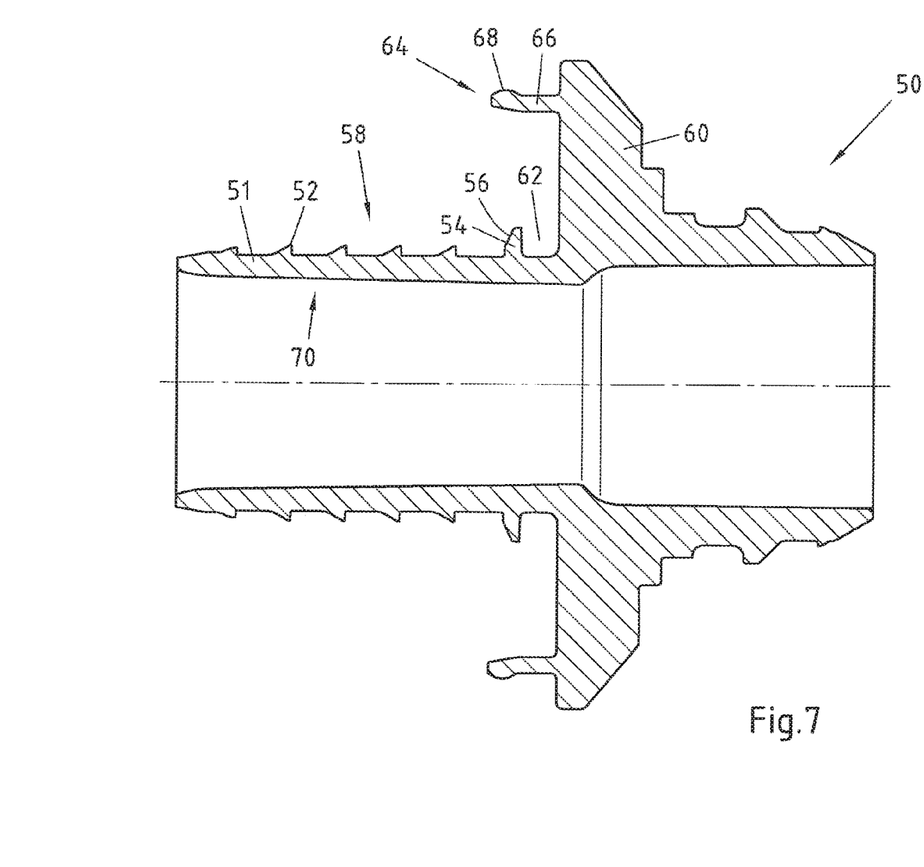
FIG. 7 shows an exemplary embodiment of a fitting in a side view in a sectional view.

In FIG. 7, an exemplary embodiment of a fitting 50 is shown in a side view in a sectional view. The support body 51 of the fitting 50 has a profiling 52 as well as a flange 54 having a cone segment-shaped surface 56 on the outer circumferential surface 58. The flange 54 forms a latch recess 62 together with the base body 60.

A means for fixing 64 is arranged on the base body 60. The means for fixing 64 consists of a tab 66 having a bulge 68. The inner circumferential surface 70 of the support body 51 is provided to be substantially cylindrical.

Figure 8:
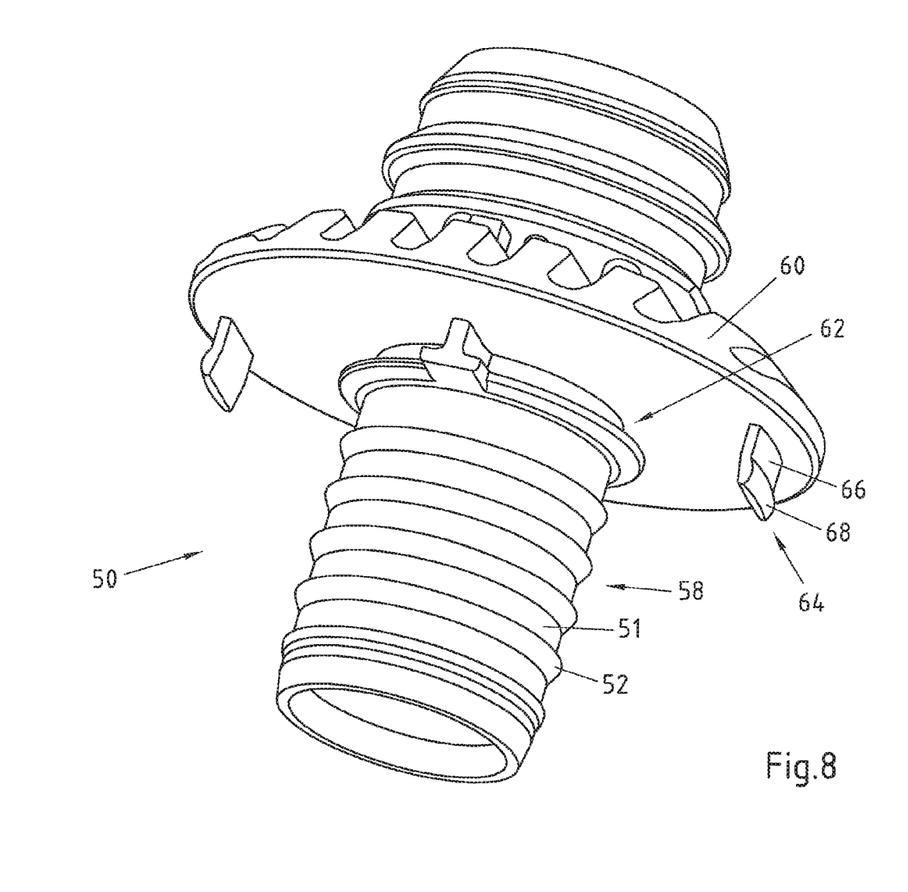
FIG. 8 shows the fitting from FIG. 7 in a perspective view.
Figure 9:
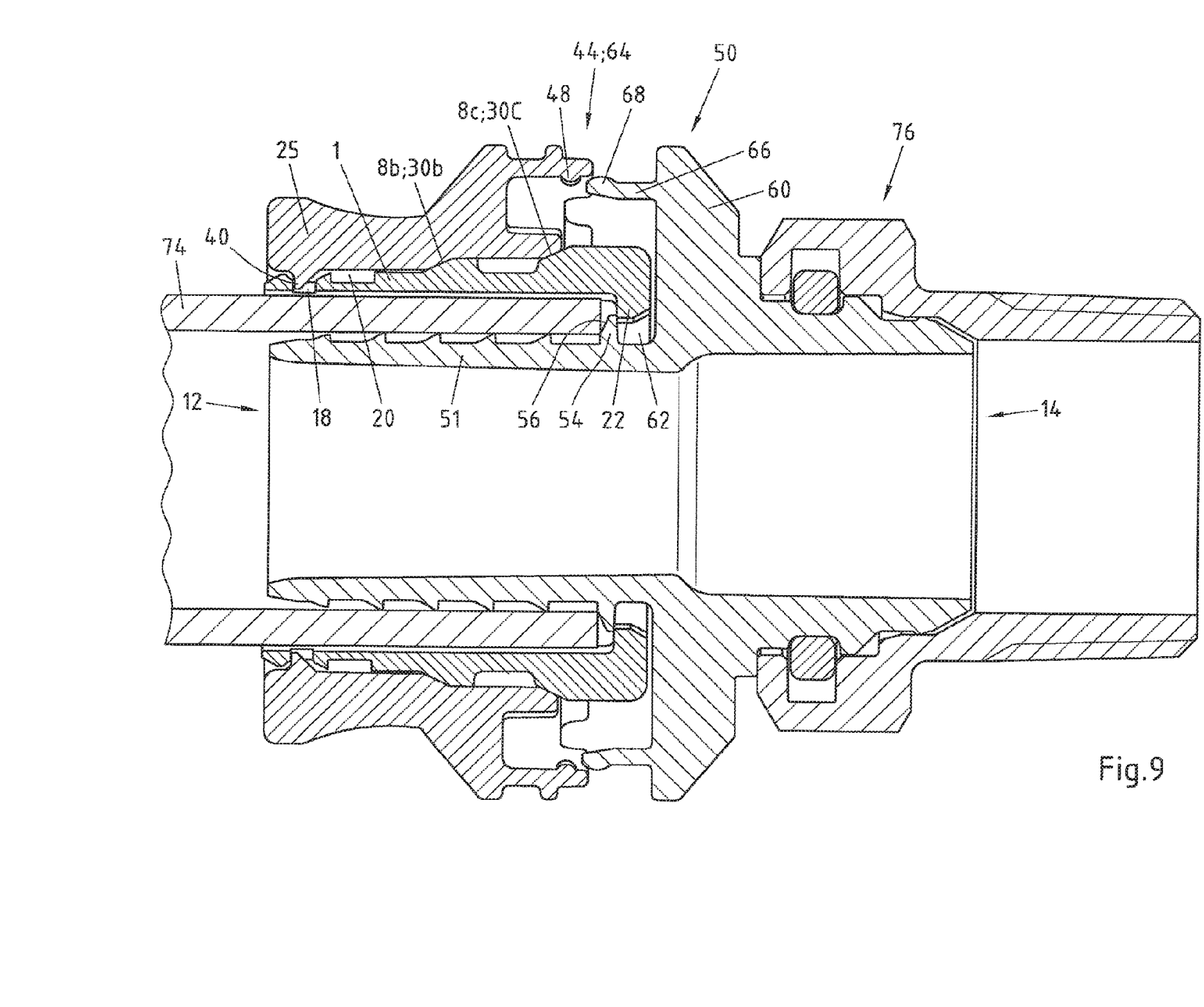
FIG. 9 shows an arrangement of the clamping ring, the sliding sleeve and the fitting from the previous figures in the uncompressed state in a side view in a first sectional view.

FIG. 8 shows the fitting 50 from FIG. 7 in a perspective view. FIG. 9 shows an arrangement of the clamping ring 1, the sliding sleeve 25 and the fitting 50 from the previous figures in the uncompressed state in a side view in a first sectional view. The sectional plane is here selected, for the clamping ring 1, to be analogous to FIG. 2 and, for the sliding sleeve 25, to be analogous to FIG. 5. The clamping ring 1 is slid onto the support body 51 of the fitting 50. The cone segment-shaped surface 56 of the flange 54 facilitates the sliding of the latch protrusion 22 into the latch recess 62. The latch protrusion 22 reaches radially inwards into the latch recess 62 and fixes the clamping ring 1 temporarily on the fitting 50.

The sliding sleeve 25 is slid outwards onto the clamping ring 1. The holding protrusion 40 reaches radially inwards into the holding recess 18 and fixes the sliding sleeve 25 temporarily on the clamping ring 1. In the uncompressed state shown in FIG. 9, the cone segment-shaped portions 8a, 8b, 8c; 30a, 30b, 30c of the clamping ring 1 and the sliding sleeve 25 are in contact.

Figure 10:
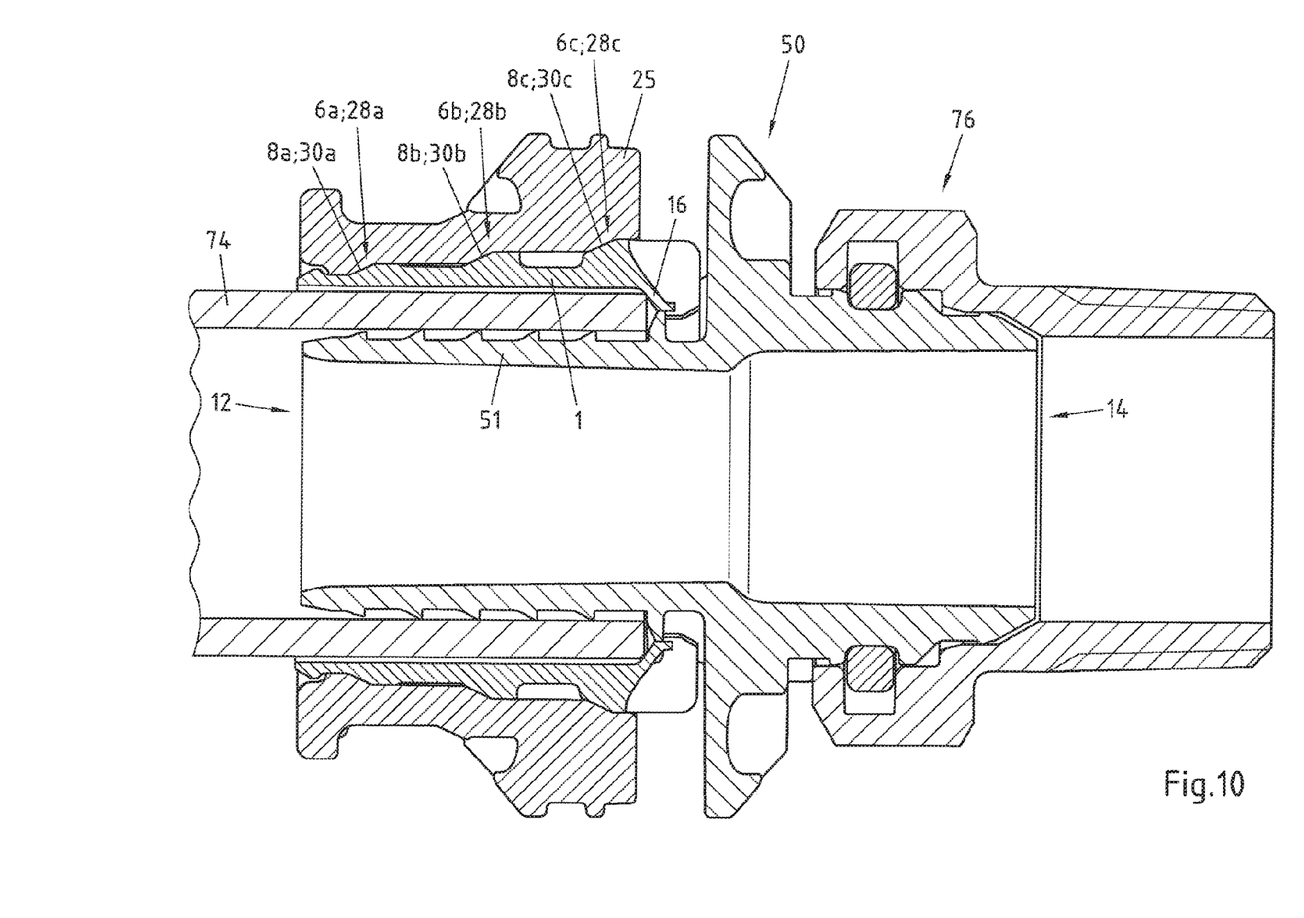
FIG. 10 shows the arrangement from FIG. 9 in a second sectional view.

FIG. 10 shows the arrangement from FIG. 9 in a second sectional view, wherein the sectional plane is selected, for the clamping ring 1, to be analogous to FIG. 1 and, for the sliding sleeve 25, to be analogous to FIG. 4. The positioning aid 16 arranged on the inner circumferential surface 2 of the clamping ring 1 is in contact with the flange 54 on the support body 51 of the fitting 50 and ensures a coaxial arrangement of the clamping ring 1 and the fitting 50. During the introduction of a pipe 74 between the clamping ring 1 and the fitting 50, the pipe 74 is slid against the flange 54.

After the introduction of the pipe 74 between the clamping ring 1 and the fitting 50, the compression can occur. Using a pressing tool, the sliding sleeve 25 is slid onto the clamping ring 1 in the direction of the proximal end 14. The cone segment-shaped portions 8a, 8b, 8c; 30a, 30b, 30c which are in contact have the same cone opening angle and therefore form sliding surfaces between the clamping ring 1 and the sliding sleeve 25 during the sliding. By means of the cone segment-shaped portions 8a, 8b, 8c; 30a, 30b, 30c, the axial movement of the sliding sleeve 25 is partially converted into a pressing force acting radially inwards on the clamping ring 1. Here, due to a high cone opening angle and short axial lengths of the cone segment-shaped portions 8a, 8b, 8c; 30a, 30b, 30c, a high pressing force can be caused with only a small axial pressing path. Due to the same axial spacing of the transmission regions 6a, 6b, 6c; 28a, 28b 28c, as well as the same cone opening angles and the same axial lengths of the cone segment-shaped portions 8a, 8b, 8c; 30a, 30b, 30c of the clamping ring 1 and the sliding sleeve 25, the compression occurs at the same time and evenly on all transmission regions 6a, 6b, 6c; 28a, 28b 28c. The clamping ring 1 tapers and thereby transmits the pressing force acting radially inwards onto the pipe 74. The pipe 74 is thereby formed into the profiled support body 51 of the fitting 50 and a non-releasable and tight pipe connection is produced.

A connection 76 is arranged on the base body 60 of the fitting 50 on the pipe end-side. This can be, for example, a screw connection to receive further workpieces. A symmetrical construction of the fitting 50 to connect two pipes is also possible, for example.

Figure 11:
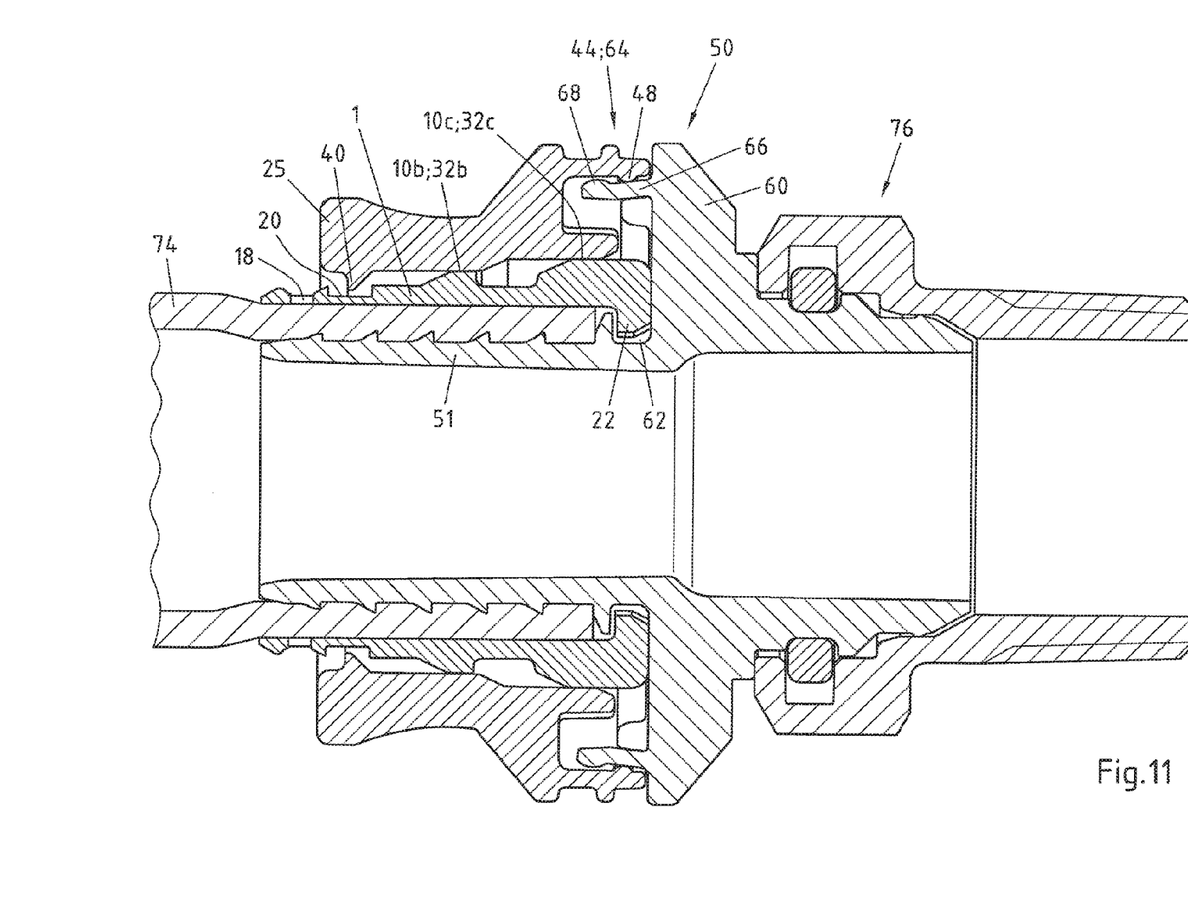
FIG. 11 shows the arrangement from FIGS. 9 and 10 in the compressed state in the same view as FIG. 9.

FIG. 11 shows the arrangement in the view from FIG. 9 in the compressed state. Due to the compression, the sliding sleeve 25 is slid so far onto the clamping ring 1 that the cylindrical portions 10a, 10b, 10c; 32a, 32b, 32c are in contact. The cylindrical portions 10a, 10b, 10c; 32a, 32b, 32c maintain the pressing force resulting during the compression in the compressed state and therefore secure the forming of the pipe 74 on the fitting 50.

The resulting tapering of the clamping ring 1 causes a radial sliding of the latch protrusion 22 into the latch recess 62 on the fitting 50. The combination of the latch protrusion 22 and the latch recess 62 keeps the clamping ring 1 on the fitting 50.

The holding protrusion 40 reaches into the latch recess 20 on the clamping ring 1 after the compression and therefore secures the sliding sleeve 25 on the clamping ring 1. The bulge 68 of the means for fixing 64 on the base body 60 of the fitting 50 is slid during the compression by deflection of the tab 66 over the bulge 48 of the means for fixing 44 on the sliding sleeve 25. After the compression, the means for fixing 44; 64 are connected by the bulges 48; 68 lying one behind the other and hold the sliding sleeve 25 in this position on the fitting 50.

Figure 12:
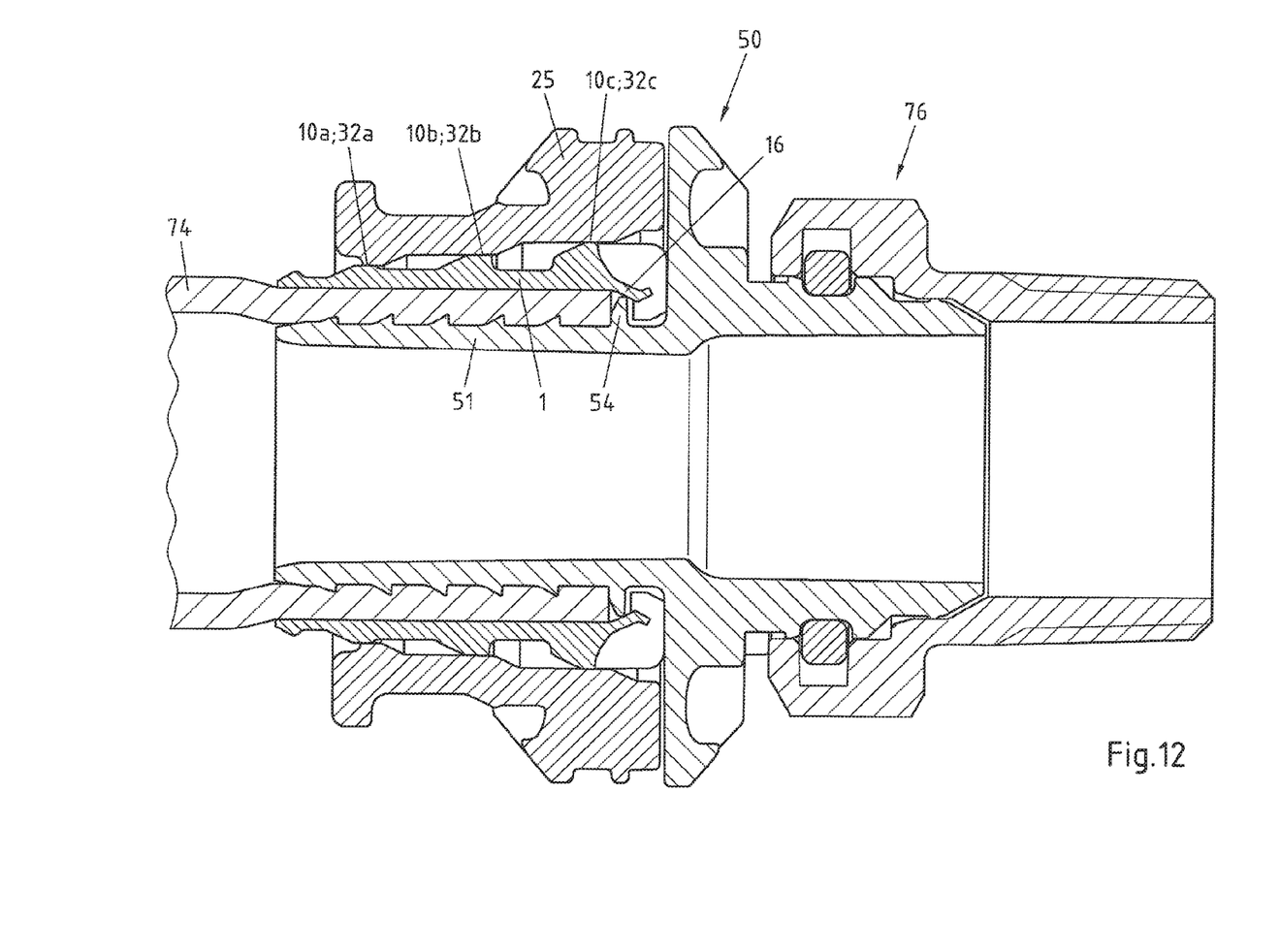
FIG. 12 shows the arrangement from FIGS. 9-11 in the compressed state in the same view as FIG. 10.

FIG. 12 shows the arrangement in the view from FIG. 10 in the compressed state. The positioning aid 16 has been slid over the flange 54 during compression.

The invention claimed is:

1. An arrangement for producing a non-releasable workpiece connection, comprising:
a fitting,
a clamping ring, and
a sliding sleeve,
wherein the fitting has a profiled support body,
wherein the clamping ring has an inner circumferential surface and an outer circumferential surface as well as a proximal end and a distal end,
wherein the sliding sleeve has an inner circumferential surface and an outer circumferential surface as well as a proximal end and a distal end,
wherein
at least two transmission regions which are spaced apart from each other in an axial direction are arranged on the outer circumferential surface of the clamping ring and on the inner circumferential surface of the sliding sleeve respectively,
each transmission region of the clamping ring is allocated to a transmission region of the sliding sleeve,
the transmission regions of the clamping ring and the sliding sleeve have cone segment-shaped portions,
the transmission regions of the clamping ring and the sliding sleeve have cylindrical portions,
wherein due to the distribution of the transmission regions, during an axial sliding of the sliding sleeve a pressing force can be exerted in sections over an axial length of the clamping ring, and
wherein the cylindrical portions represent contact surfaces between the clamping ring and the sliding sleeve in the completed connection and can maintain a radial pressing force after the axial sliding.

2. The arrangement according to claim 1, wherein at least two of the cone segment-shaped portions at the clamping ring and at the sliding sleeve have the same cone opening angle and the same axial length.

3. The arrangement according to claim 2, wherein the respective diameter of the individual cylindrical portions at the clamping ring increases from the distal end to the proximal end and the respective minimum diameter of the individual cylindrical portions at the sliding sleeve increases from the distal end to the proximal end.

4. The arrangement according to claim 2, wherein the cone segment-shaped portions at the clamping ring and at the sliding sleeve are formed ring shaped in circumference or several cone segment-shaped portions at the clamping ring and at the sliding sleeve are arranged on a trajectory which is ring shaped in circumference.

5. The arrangement according to claim 2, wherein the cone segment-shaped portions at the clamping ring and at the sliding sleeve are arranged at regular axial distances.

6. The arrangement according to claim 2, wherein the clamping ring has a slot at least over a part of the length in the axial direction.

7. The arrangement according to claim 1, wherein a respective diameter of the individual cylindrical portions at the clamping ring increases from the distal end to the proximal end and a respective minimum diameter of the individual cylindrical portions at the sliding sleeve increases from the distal end to the proximal end.

8. The arrangement according to claim 7, wherein the cone segment-shaped portions at the clamping ring and at the sliding sleeve are formed ring shaped in circumference or several cone segment-shaped portions at the clamping ring and at the sliding sleeve are arranged on a trajectory which is ring shaped in circumference.

9. The arrangement according to claim 7, wherein the cone segment-shaped portions at the clamping ring and at the sliding sleeve are arranged at regular axial distances.

10. The arrangement according to claim 7, wherein the clamping ring has a slot at least over a part of the length in the axial direction.

11. The arrangement according to claim 1, wherein the cone segment-shaped portions at the clamping ring and at the sliding sleeve are formed ring shaped in circumference or several cone segment-shaped portions at the clamping ring and at the sliding sleeve are arranged on a trajectory which is ring shaped in circumference.

12. The arrangement according to claim 11, wherein the cone segment-shaped portions at the clamping ring and at the sliding sleeve are arranged at regular axial distances.

13. The arrangement according to claim 11, wherein the clamping ring has a slot at least over a part of the length in the axial direction.

14. The arrangement according to claim 1, wherein the cone segment-shaped portions at the clamping ring and at the sliding sleeve are arranged at regular axial distances.

15. The arrangement according to claim 14, wherein the clamping ring has a slot at least over a part of the length in the axial direction.

16. The arrangement according to claim 1, wherein the clamping ring has a slot at least over a part of the length in the axial direction.

17. A method for producing a non-releasable workpiece connection between a fitting, a pipe, a clamping ring and a sliding sleeve, comprising:
providing the fitting with a profiled support body and arranging the clamping ring on the fitting,
introducing the pipe between the clamping ring and the support body of the fitting,
allocating at least two transmission regions to each other and spacing the transmission regions apart from each other in an axial direction and bringing them into contact with cone segment-shaped portions and with cylindrical portions on an outer circumferential surface of the clamping ring and on an inner circumferential surface of the sliding sleeve respectively and
exerting a pressing force directed radially inwards on the pipe against the support body by the transmission regions during an axial sliding of the sliding sleeve onto the clamping ring,
exerting a pressing force in sections over an axial length of the clamping ring, during the axial sliding of the sliding sleeve, due to the distribution of the transmission regions, and
wherein the cylindrical portions represent the contact surfaces between the clamping ring and the sliding sleeve in the completed connection and maintain a radial pressing force after the axial sliding.

18. The method according to claim 17, wherein approximately the same radial displacement of the pipe is generated by several transmission regions during the axial sliding, respectively.

* * * * *